(12) United States Patent
Pestoni et al.

(10) Patent No.: US 10,762,053 B2
(45) Date of Patent: Sep. 1, 2020

(54) SYNCHRONIZATION FOR CROSS-CONTEXT DIGITAL ITEM CONTAINERS AND COLLABORATION

(71) Applicants: ATLASSIAN PTY LTD, Sydney (AU); ATLASSIAN, INC., San Francisco, CA (US)

(72) Inventors: Florian Pestoni, Mountain View, CA (US); Balazs Nagy, San Jose, CA (US); Mark Roudebush, San Francisco, CA (US)

(73) Assignees: Atlassian Pty Ltd, Sydney (AU); Atlassian, Inc., San Francisco, CA (US)

( * ) Notice: Subject to any disclaimer, the term of this patent is extended or adjusted under 35 U.S.C. 154(b) by 92 days.

(21) Appl. No.: 16/233,733

(22) Filed: Dec. 27, 2018

(65) Prior Publication Data

US 2020/0104280 A1 Apr. 2, 2020

Related U.S. Application Data

(60) Provisional application No. 62/737,569, filed on Sep. 27, 2018.

(51) Int. Cl.
| | | |
|---|---|---|
| G06F 16/30 | (2019.01) | |
| G06F 16/176 | (2019.01) | |
| G06Q 10/10 | (2012.01) | |
| G06F 16/903 | (2019.01) | |
| G06F 16/9038 | (2019.01) | |
| G06F 40/194 | (2020.01) | |
| G06F 40/197 | (2020.01) | |

(52) U.S. Cl.
CPC ........ *G06F 16/176* (2019.01); *G06F 16/9038* (2019.01); *G06F 16/90335* (2019.01); *G06F 40/194* (2020.01); *G06F 40/197* (2020.01); *G06Q 10/101* (2013.01)

(58) Field of Classification Search
CPC .............. G06F 16/176; G06F 16/9038; G06F 16/90335; G06F 16/285
USPC ....... 707/607, 609, 687, 705, 769, 790, 813, 707/821
See application file for complete search history.

(56) References Cited

U.S. PATENT DOCUMENTS

| | | | |
|---|---|---|---|
| 10,540,404 B1 * | 1/2020 | Dang | G06F 16/285 |
| 2012/0143674 A1 * | 6/2012 | Ziskrout | G06Q 30/0244 |
| | | | 705/14.43 |
| 2013/0173711 A1 * | 7/2013 | Pignatelli | H04L 67/22 |
| | | | 709/204 |
| 2016/0234026 A1 * | 8/2016 | Wilkins | H04L 9/3247 |

(Continued)

*Primary Examiner* — Sana A Al-Hashem
(74) *Attorney, Agent, or Firm* — Kevin W. Miller; Hickman Palermo Becker Bingham LLP

(57) ABSTRACT

Techniques for synchronization for cross-context digital item containers and collaboration are provided, receiving a user command to share a particular digital item from a first portfolio of digital items with a second portfolio of digital items. In response receiving the command to share the digital item, making a digital copy of it and placing it in the second portfolio of digital items. Subsequently, an alteration is made to the digital item and a determination is made with whom to share the alteration among those with whom the digital item had been previously shared. Those alterations can be accepted (or rejected) by the other portfolios. When they are accepted, they are applied to the digital copy.

20 Claims, 7 Drawing Sheets

(56) References Cited

U.S. PATENT DOCUMENTS

2018/0055435 A1\* 3/2018 Macallum ................ G09B 5/02
2018/0300324 A1\* 10/2018 Ziraknejad .............. G06F 16/93

\* cited by examiner

100

| FIRST APPLICATION | DIGITAL PORTFOLIO APPLICATION | SECOND APPLICATION |
|---|---|---|
| Request to place item in digital portfolio  110 | Receive request  111 | |
| | Place digital copy of item in digital portfolio  120 | |
| | Receive request to view digital portfolio  130 | |
| | Display interactive view of digital portfolio  131 | |
| | Provide digital copy in response  150 | Request copy of the digital item in portfolio  140 |
| | | Receive requested digital copy for use  160 |

*FIG. 1A*

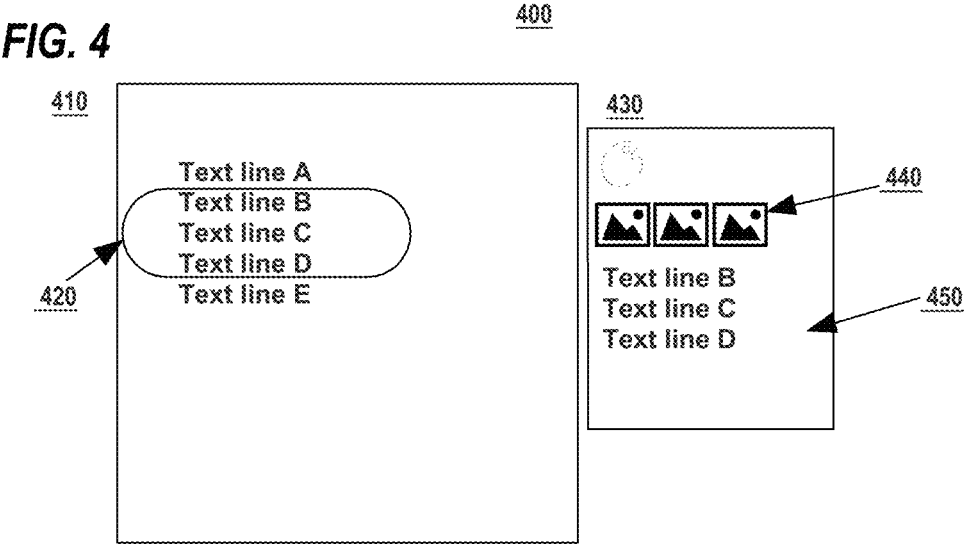
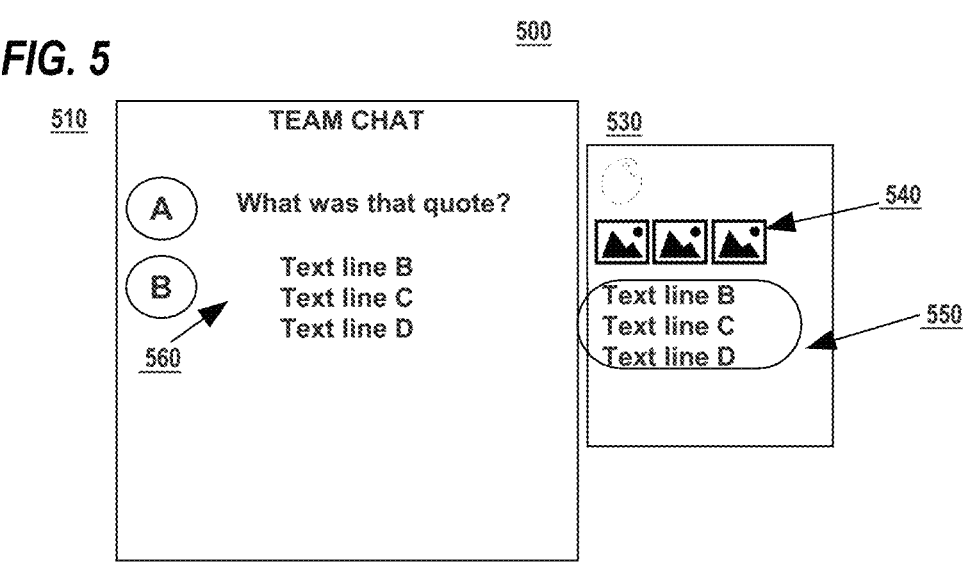

SYNCHRONIZATION FOR CROSS-CONTEXT DIGITAL ITEM CONTAINERS AND COLLABORATION

BENEFIT CLAIM

This application claims the benefit under 35 U.S.C. § 119(e) of provisional application 62/737,569, filed Sep. 27, 2018, the entire contents of which is hereby incorporated by reference for all purposes as if fully set forth herein.

FIELD OF THE DISCLOSURE

One technical field of the present disclosure is computer-implemented collaborative information management systems, and more specifically, to digital item containers and collaboration.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Collaborative document creation, editing and management among distributed teams of workers continues to present challenges for efficient implementation in distributed computer systems and application programs. The problem has become more complex recently because more workers need to assemble a larger variety of data resources of different types to complete projects. For example, advancing a project could require marshaling electronic documents, images, spreadsheets, videos, source code files, database records, issue tracking records, chat conversations, transcripts of meetings conducted via video or online, and so forth. However, each of these data items may be stored in a different storage location and/or managed by a different application. Use of multiple different applications could be required merely to retrieve and view different data items.

Furthermore, when workers are organized into teams, a first team member may be unaware that a second team member digitally owns or controls other data items that the first team member may find useful or necessary for the project. Or, if the first team member is generally aware that the second team member has relevant data items, the first team member may not know how to obtain access to those data items or may lack necessary permissions. Similarly, there may be other individuals in an enterprise who are not part of the team of the first team member, and/or unknown to the first team member, who have relevant data items.

Additionally, digital items may be shared among users. For example, one user may send a digital item to another user. That digital item may be, for example, a roster of people working on a project together. After sending the document, the first user may alter the team roster. In order to keep the second user up-to-date on the team roster, the user would have to continue to resend that document to the second user each time the document is altered. Only then would the second user have access to all of the alterations. Further, if the second user alters the team roster, then the second user would have to send it back to the first user. Such a system of sending digital items back and forth as they are altered can cause issues with synchronization, and inconsistencies in digital items shared among users.

SUMMARY

The appended claims may serve as a summary of the invention.

BRIEF DESCRIPTION OF THE DRAWINGS

In the drawings:

FIG. 1A is a flow diagram depicting a process for synchronization for cross-context digital item containers and collaboration.

FIG. 4 depicts an example user interface for synchronization for cross-context digital item containers and collaboration.

FIG. 5 depicts a second example user interface for synchronization for cross-context digital item containers and collaboration.

DETAILED DESCRIPTION

Figure 1B:
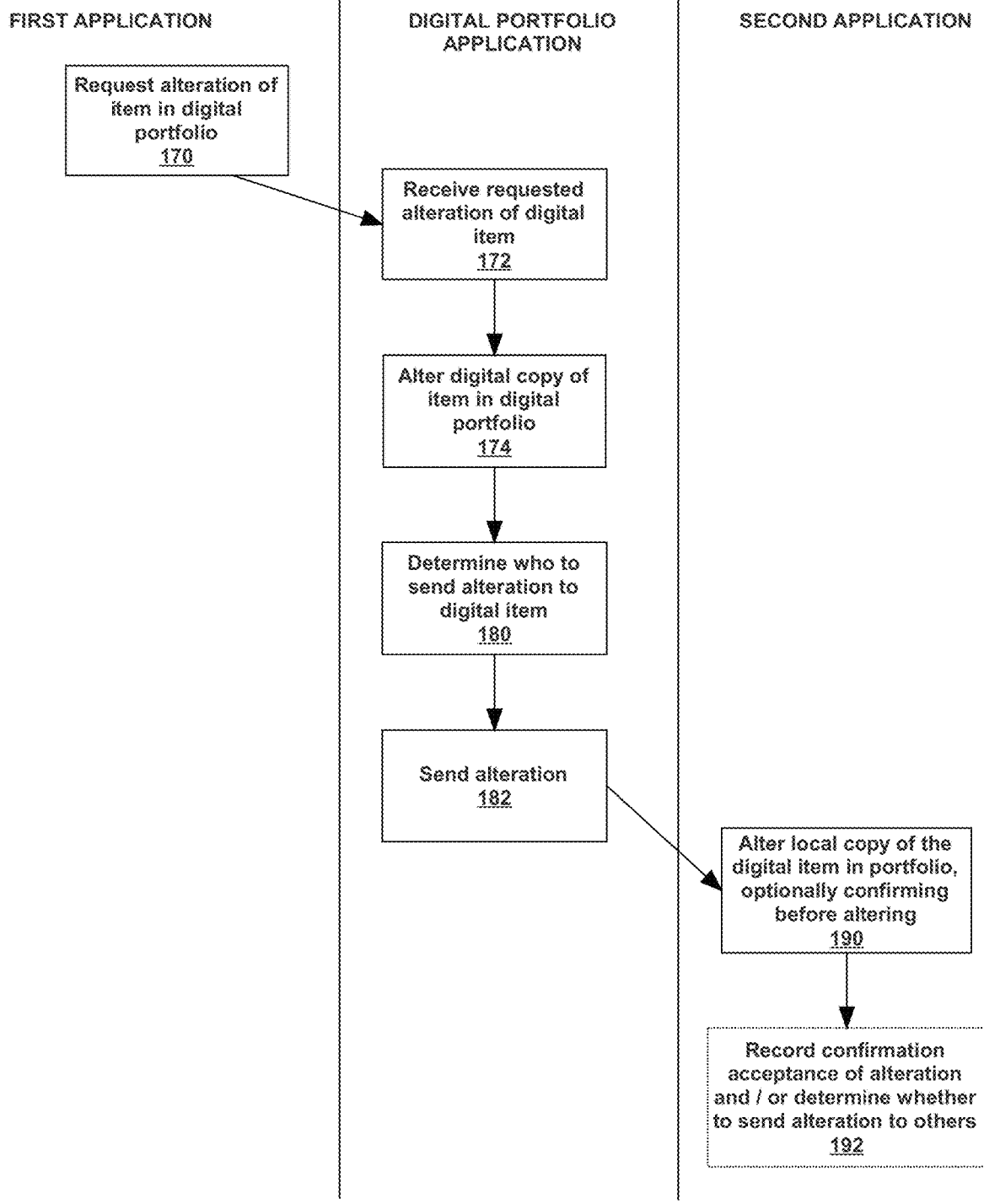
FIG. 1B is a flow diagram depicting a process for synchronization for cross-context digital item containers and collaboration.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a computer system executes program instructions that implement a portfolio of digital items, sometimes called a data resource substrate or digital item container, that accommodates a plurality of data items of any of a plurality of different data types. The portfolio is addressable by application programs to transmit data items to the portfolio of digital items rather than to an e-mail inbox, chat room or other conventional destination. The portfolio of digital items is accessible and capable of rendering and display in response to calls from any application program that is executing in the computer system and that has been configured with a compatible interface to the portfolio.

In an embodiment, the instructions implementing the portfolio of digital items are programmed to automatically detect data items that are received in a conventional manner in a compatible application. For example, if an e-mail client program has been configured to connect to the portfolio, the instructions are programmed to automatically detect the arrival of an e-mail message that contains a file attachment and to copy the attached file to the portfolio of digital items. In some embodiments, the instructions are programmed to create a link to a file attachment on a file server, rather than a copy of the file, and to store the link in the portfolio.

Links may comprise references to file system locations, universal resource locators (URLs) that identify the location of data items in internal networks or public network locations or URIs. As another example, if an image file is pasted into a chat room discussion, the instructions implementing the portfolio are programmed to automatically detect the image file and to copy the image file, or a link to the image file, to a portfolio of digital items that is associated with a user or a team.

In an embodiment, the instructions implementing the portfolio of digital items are programmed to receive explicit addition of data items to the portfolio. For example, a file, link or other data item may be explicitly added to the portfolio using input operations in a graphical user interface by using a pointing device to drag and drop the file, link or other data item from one location, such as a file server folder or application program, over the interface for the portfolio of digital items and releasing the pointing device.

In another embodiment, the instructions implementing the portfolio of digital items are programmed as a bot (script, or other logic, etc.) that is integrated into a chat room application and has a discrete name or handle. In this embodiment, a data item may be explicitly added to a portfolio of digital items by mentioning the bot in the chat room. For example, assume that the portfolio bot has a name or handle of "@substrate" or "@palette", and a user creates a chat room post having the form "@palette" followed by pasting an image, and posting the post. In response, the instructions implementing the portfolio are programmed to listen to chat room posts that mention "@palette" and to respond by adding any file, link or other data item in an associated post to the posting user's portfolio.

In an embodiment, the instructions implementing the portfolio of digital items are programmed to share a portfolio of digital items with a second user or team member in response to input from a first user or team member. Sharing may be implemented programmatically in several ways. In one embodiment, sharing comprises accessing a sharing panel in a graphical user interface and adding a user identifier to a list of shared users. In another embodiment, sharing comprises selecting a sharing link or widget and entering a user identifier; in response, the instructions implementing the portfolio of digital items are programmed to transmit a sharing notification to a second user or team member. In an embodiment, the instructions implementing the portfolio of digital items are programmed to surface or display a notification to the second user or team member in an application that a computer of the second user or team member is executing.

In an embodiment, the instructions implementing the portfolio of digital items are programmed to receive modifications, alterations, additions, deletions, or updates to a portfolio of digital items and to transmit the modifications, alterations, or updates to all other users of the same portfolio, or with whom the portfolio has been shared. In an embodiment, the functionality of the preceding sentence may be implemented by digitally storing a representation of each portfolio of digital items in a discrete location of a data repository, for which access is shared. For example, a first user may share a document containing a roster of project team members with a second user. In response to receiving a command to share the digital item, a copy is made and placed in the second portfolio of digital items. When the first user alters the particular digital item in the first portfolio of digital items, it is determined with whom to share the alteration. For example, when the first user alters the roster of project team members, because that document had previously been shared with the second user's portfolio of digital items, a decision can be made to share the alteration of the roster with the second portfolio of digital items. The second portfolio of digital items can then determine whether to accept the alteration to the digital item made in the copy of the digital item in the first portfolio of digital items. Details on when and whether to accept alteration to particular digital items are discussed extensively herein and examples include accepting all changes to any digital item, accepting all changes to a particular digital item, accepting all changes from a particular user account, requiring confirmation for changes to digital items, and the like.

The techniques proceed by applying the alteration to the particular digital item in the second portfolio of digital items when it is determined to accept the received alteration of the particular digital item. For example, if the second user is alerted with a change that the first user made to the roster, that change can be presented to the second user and the second user can accept or reject the change. If the change is accepted, then the copy of particular digital item in the second portfolio of digital items will be altered with the change. In some embodiments the second user may accept or reject a number of changes at once.

In some embodiments, the program or application that manages the portfolio of digital items is called the digital portfolio application. The digital portfolio application may be implemented using object-oriented programming techniques in a multi-threaded environment. In such an implementation, programmatic objects that implement the portfolio of digital items and bots (scripts, other logic, etc.) are programmed to generate programmatic signals, such as events, method calls or invocations to other objects or methods that form part of the portfolio of digital items implementation. One result is that a particular action on a shared portfolio is immediately visible to all users who have access to the shared portfolio, and who are executing an application that is integrated to the portfolio system.

Example Processes

FIG. 1A is a flow diagram depicting a process 100 for synchronization for cross-context digital item containers and collaboration. Generally, the techniques proceed by a first application requesting to place a digital item into a portfolio of digital items. This could be a request, for example, to place an image into the portfolio of digital items. The portfolio of digital items receives the request and then places a digital copy of the item (in this example, the image) in the portfolio of digital items. At some time later, the digital portfolio application receives a request to view the portfolio of digital items. The digital portfolio application then displays an interactive view of the portfolio of digital items. The interactive view of the portfolio of digital items may allow for one or more applications and/or user interactions to occur that will allow addition to the portfolio of digital items, copying from the portfolio of digital items, editing the portfolio of digital items, and the like. At some time later a second application may request a copy of a digital item in the portfolio of digital items. Based on this request for the copy of the digital item, the digital portfolio application may provide the digital copy in response to the request. The second application may then receive the requested digital copy for use in the second application. In the example above, the second application may request use of the image that was placed into the portfolio of digital items. The second application may then receive the image for use in the second application. More details of handing alterations of digital items after they have been shared are detailed more herein and with respect to FIG. 1B and process 101.

Returning to the top of FIG. 1A, the process 100 proceeds by first having a request 110 to place the digital item in the portfolio of digital items. This request to place a digital item into a portfolio of digital items can take many forms. For example, in some embodiments, the request to place a digital item in the portfolio of digital items may include a dragging motion on a user interface, for example from the first application to an interactive representation of the portfolio of digital items. This dragging motion may be interpreted as the request to place the digital item in the portfolio of digital items. Turning to FIG. 4, which shows an example user interface 400 for cross-platform digital item containers and collaboration, the first application 410 interface may allow for selection 420 of text lines B-D. This selected digital item (the text) may be dragged from the first application 410 to the interactive representation of the portfolio of digital items 430. The text lines B-D are then copied 450 into the portfolio of digital items 430. As depicted in FIG. 4, the portfolio of digital items 430 may also include other previously copied or pre-existing digital items, such as the images 440.

In some embodiments, receiving a request 110 to place an item in a digital portfolio may include receiving a digital mention to add the particular digital item to the portfolio of digital items. A digital mention may include, for example, an @ symbol before the word "palette" or another keyword as described elsewhere herein. This particular digital mention may be parsed and interpreted to add the information or digital items after the digital mention to the portfolio of digital items. In some embodiments, the digital mention may also include information for a second user account. In such embodiments, receiving the digital mention for the second user account may add the particular digital item to a second portfolio of digital items for the second user account. For example, if a user A puts in an @mention for user B's portfolio of digital items, then that @mention may add the digital item after the @mention to the portfolio of digital items for the second user account.

In some embodiments, in order to obtain the benefits of the techniques described herein, a user may have to provide access to allow certain or all other users to add items to their portfolio of digital items. In such embodiments, only after such permission has been given, may another user account add items to that portfolio of digital items that granted the access.

In some embodiments, an electronic mail that goes to a particular email address related to the portfolio of digital items may be used as the mechanism to request addition of digital items to a portfolio of digital items. For example, an email address of palette@domain.com may include one or more digital items and the sending of that email to the palette@domain.com may indicate that the digital items in the email should be added to the portfolio of digital items. In some embodiments, the address from which the email is sent may indicate which portfolio of digital items to add the contents of the email to. For example, if user A sends an email to palette@domain.com then the digital items in the email may be added to user A's palette.

After the first application requests 110 the placement of a digital item in the portfolio of digital items, the portfolio of digital items will receive 111 the request. The sending of the request and the receipt of the request may take many forms, including remote procedure calls, TCP/IP messages, UDP messages, email messages, SSL messages, HTTP(S) streams, API calls, and the like.

After receiving 111 the request, a digital copy of the item is placed in the portfolio of digital items. Placing 120 a digital copy of the item in the portfolio of digital items may include, creating a digital copy of the digital item and storing it in one or more memories. The portfolio of digital items may have a pointer to this memory or the memory may be associated with a portfolio of digital items.

In some embodiments, more than one user account may share the same portfolio of digital items. For example, user A and user B may both share a single portfolio of digital items. User A may request placement of items in that portfolio of digital items, and so may user B. User A and user B may also both request use of items in that portfolio of digital items. In some embodiments, relatedly, a user may share a duplicate copy of a portfolio of digital items with another user. For example, user A may share a portfolio of digital items with user B and user B may then have a separate copy of that portfolio of digital items. Then, when user B modifies the portfolio of digital items, user B's copy of the portfolio of digital items will be modified, but user A's copy will not be modified because the two are logically separate digital copies of digital portfolios of items. In some embodiments, when an alteration of a digital items is made, propagation of that alteration may be handled by process 101 of FIG. 1B.

After the digital copy of the item is placed 120 in the portfolio of digital items, and at some later time, a request may be received to view the portfolio of digital items. For example, the digital portfolio application may receive 130 a request to view the portfolio of digital items from the second application. Receiving 130 the request to view the portfolio of digital items may take many forms, such as a remote procedure call, an API call, a communication over TCP/IP, SSL, UDP, HTTP(S), double-clicking on an icon on a computer or phone screen, and the like. After receiving 130 the request to view the portfolio of digital items, the digital portfolio application may display 131 an interactive view of the portfolio of digital items. The interactive view of the portfolio of digital items may take many forms, including an interface window on a computing device interface that allows for the types of interactions enabling user interaction techniques to cause additions to, or copies from, the portfolio of digital items. For example, the interactive view of the portfolio of digital items may allow for selection of items in the portfolio of digital items and dragging those items to another application, such as the first application or the second application. Examples of interactive user interfaces for viewing the portfolio of digital items are given in interface 400 of FIG. 4, interface 500 of FIG. 5, interface 600 of FIG. 6, and interface 700 of FIG. 7.

In some embodiments, not depicted in FIG. 1A, the digital portfolio application may include one or more filters for the portfolio of digital items. If a user account selects a particular filter, then only information or digital items related to or satisfying those filters may be shown in the portfolio of digital items. For example, a filter may indicate that the user account only wants to see digital items that are or contain text. Selecting such a filter would only show text items from the portfolio of digital items when displaying 131 the interactive view of the portfolio of digital items. Other filters may include, date and/or time when the digital item was added (or created, modified, etc.), identity of the user account associated with the addition of the digital item to the portfolio of digital items, size of digital item, and the like.

The second application may request 140 a copy of the digital item from the portfolio of digital items. In some embodiments, this request 140 for a copy of the digital item may take many forms, such as selection and/or dragging of items from the interactive view of the portfolio of digital items into the second application, an @mention from the second application, and the like. For example, if a user types in an @mention in the team chat 510 which references the portfolio of digital items 530 and the particular digital item 550 to add to the team chat, that @mention may be parsed and replaced with text, such as text line B-D 560 and placed within the team chat 510.

In some embodiments, the digital portfolio application is running separately from the second application, and any other applications running on the computing device(s). As a user transitions from the first application to the second application and any other applications running on that device, the interactive view of the portfolio of digital items may remain active and within view on the display of the device. In some embodiments, this is advantageous because the portfolio of digital items will always be available to add items to the portfolio of digital items and/or use items from the portfolio of digital items in that application.

After the second application has requested 140 a copy of the digital item, the digital portfolio application may provide 150 a digital copy of the particular item in response to the request 140. As discussed above, this copy of the digital item may be provided in any appropriate way, including, via API, via FTP, over a digital stream such as TCP/IP, UDP, SSL, HTTP(S), et cetera. After the digital portfolio application has provided 150 the digital copy in response to the original request 140, the second application can receive 160 the requested digital copy for use in the second application. Once received, in some embodiments, the second application can use the digital item in any appropriate manner. For example, if the digital item is an image, that image may be pasted into an electronic document, used in a chat room, and the like. Received 160 text may be used in a document, in a chat room, or in any other appropriate manner.

In some embodiments, the received 160 digital copy will remain immutable regardless of the changing and/or deletion of the item from the portfolio of digital items. In other embodiments, when the item from the portfolio of digital items is changed and/or deleted, the copy in the second application that had been received 160 will similarly be changed and/or be removed or deleted in the receiving 160 application based on the change in the underlying digital item in the portfolio of digital items.

Using the techniques herein, a user may be able to receive digital items from multiple applications and/or multiple users. All of these digital items are in one easy-to-use place and can be provided to, and/or used in multiple applications. Additionally, users can share access to their portfolio of digital items or send a copy of the portfolio of digital items. This may allow for much more efficient use of a wide array of digital items in multiple applications. This is the case both for a single user account, and for multiple user accounts. For example, a team may use a single portfolio of digital items in order to share, in one collaborative space, digital items useful to the entire team. A single user may also have his or her own portfolio of digital items. When a new user joins a team, an existing user may provide that new user access to and/or a copy of his or her portfolio of digital items in order to give that person a quick head start on the appropriate digital items to be using for the work with the team.

Not depicted in FIG. 1A, interactions with the portfolio of digital items may also include modification of a digital item and/or deletion of a digital item in the portfolio of digital items. For example, in some embodiments, user interactions or commands may modify digital items in the portfolio of digital items. This may include the use of a text editor to modify the text of digital items in the portfolio of digital items; use of an image manipulation program to modify digital images in the portfolio of digital items; and the like. In some embodiments, an application can modify a digital item by replacing the digital item. For example, using techniques similar to those described herein, a digital item may be dragged, emailed, etc., along with an indication that it is to replace an existing digital item. In some embodiments, the digital portfolio application can receive commands (e.g., via the interactive display of the portfolio of digital items) that can delete or remove one or more digital items from the portfolio of digital items.

FIG. 1B depicts a process 101 for synchronization for cross-context digital item containers and collaboration. Process 101 proceeds by a first application requesting 170 alteration of an item in its digital portfolio. A first application requesting 170 alteration of an item in a digital portfolio can take many forms. For example, the portfolio of digital items may have been constructed via process 100. One or more of the digital items may have been shared with other user accounts, as depicted in process 100. The request to alter the item in the digital portfolio may include altering a document, editing a picture, altering a spread sheet, adding or deleting a file, accepting an alteration from another user and the like. The request 170 for alteration of item in the digital portfolio may be sent from the first application to a digital portfolio application, such as from first application 230 and digital portfolio application 210 via network 290 in FIG. 2. As discussed with respect to FIG. 2, the request may be sent over any appropriate means, including an API call, a remote procedure call, via TCP/IP, via HTTP or HTTPS, and the like.

The digital portfolio application receives 172 the requested alteration of the digital item. The digital portfolio application may be digital portfolio application 210 of FIG. 2. Various embodiments of the digital portfolio application are described elsewhere herein, including with respect to FIG. 1A and FIG. 2. The digital portfolio may receive 172 the requested alteration of the digital item via any appropriate mechanism, such as an API, a remote procedure call, HTTP or HTTPS, and the like.

After receiving 172 the request to alter a digital item, the digital portfolio application will alter 174 the digital copy of the item in the portfolio of digital items. Altering 174 the digital copy of the digital item in the portfolio may include applying the changes originally requested 170 by the first application. For example, a document may be added or deleted, a picture may be altered, a spread sheet may be modified, and alike. After altering 174 the digital copy of the item in the digital portfolio, if the item had been previously shared, for example via process 100, then the digital item will be in a different state than previously shared-version of the item. As such, the digital portfolio application will determine 180 to whom to send the alteration or alteration of the digital item. In some embodiments, the determination 180 of to whom to send the alteration of the digital item will include determining with whom they digital item had been previously shared. For example, turning to process 100, each time a request 140 for a copy of a digital item in a digital portfolio is sent to a digital portfolio application and that digital copy is provided 150 back to the requesting application, the digital portfolio application may retain metadata indicating with whom each digital item in the portfolio of digital items have been shared. This sharing metadata can be used to determine 180 with whom to share alterations. A particular digital item may have been shared with multiple other portfolios. As such, when a determination 180 is made to with whom to share the particular digital item, the determination may include sending the alteration to multiple other applications. Further, the alteration may then be sent to those multiple applications.

In some embodiments, all alterations will be sent to all portfolios of digital items with whom the digital item had been shared. In some embodiments, a user account, and/or an application may indicate that it does not want to receive alterations to any digital items, or particular digital items. As such, those applications or user account request not to receive alterations to digital or particular digital items and may not be included in the group determined 180 to receive updates or alternations. In some embodiments a digital portfolio may itself indicate that it does not want any digital items or particular digital items to receive alterations. As such, the digital portfolio requests that those items not receive alterations to digital or particular digital items and those items may not be included in the group determined 180 to receive updates or alterations.

Based on who is determined 180 to receive alterations to digital items, the alterations are sent 182 to those applications. Sending 182 an alteration to an application (e.g., at least a second application as depicted in FIG. 1A) may include calling an API, invoking a remote procedure call, sending via HTTP or HTTPS, and/or the like.

In some embodiments, all alterations are accepted by, for example, a second application, and upon receiving the second application may alter 190 a local copy of the digital item in the portfolio based on the alteration received. In some embodiments, all alterations for a particular digital item may be accepted and applied. This may happen automatically, and the second portfolio of digital items in which the particular digital item has been shared may automatically alter the particular digital items in that portfolio. In some embodiments, however, a determination is first made whether to accept the alteration. For example, only alterations from particular user accounts may be accepted. A user may indicate that all alterations from a project manager, a boss, a particular colleague, etc. should be automatically accepted and applied to digital items in the portfolio of digital items. In some embodiments, a user may indicate that all alterations to a particular digital item may be automatically accepted (regardless of who made and suggested the change). For example, a user associated with the second application may indicate that a particular digital item, such as a document containing team roster should always be altered automatically. By indicating this, the team roster will be altered automatically each time an alteration for the team roster is received.

In some embodiments, the second application may receive many alterations for a single or for multiple digital items in the second portfolio of digital items. Those alterations may be ranked based on one or more factors, and the ranked alternatives may be provided for display so that a user associated with the second application can choose which alterations to accept. For example, if the second application is associated with a second portfolio of digital items that has tens or hundreds of digital items and many of those digital items are associated with received alterations, then all of those alterations may be ranked so that a user using the second application can review the alterations in a ranked fashion and decide which ones to accept or reject.

In some embodiments, ranking the multiple alterations is based at least on a similarity of the second user account with a user account associated with the corresponding alteration. For example, if the second user account and the account making the alteration are on the same team, work in the same office, work on the same projects, have similar items in their digital portfolios and alike then those two user accounts may be seen as similar and alterations from those similar user accounts may be ranked higher. In some embodiments, in addition to or instead of ranking based on similarities of accounts the multiple alterations may be ranked based at least in part on whether the second user has previously accepted alterations from the user account associated with the corresponding alteration. For example, if the second user account often, or always, accepts alterations from a particular user, such as his or her manager, a teammate, a friend, an influencer, etc., then those alterations may be highly ranked. In some embodiments, in addition to or instead of the ranking techniques discussed elsewhere herein, the multiple alterations may be ranked at least in part on when the alteration was made. For example, the most recent alterations may be surfaced at the top of the rankings or the oldest alterations may be surfaced at the top of the rankings (or vice-versa).

In some embodiments, ranking the multiple alterations is based at least on a similarity of the items in the second portfolio with the items in a portfolio associated with the corresponding alteration. For example, if the second portfolio and the portfolio upon which the alterations are based have similar items or items containing similar metadata then those two portfolios may be seen as similar and alterations from those similar portfolios may be ranked higher. In some embodiments, in addition to or instead of the ranking techniques discussed elsewhere herein, the multiple alterations may be ranked at least in part on the proportion of items which are not similar in two similar profiles. For example, set of items in the second portfolio are different than items in the portfolio associated with the corresponding alteration, and that set of items constitute a small proportion of the overall items in the second portfolio, alterations to the second portfolio may be surfaced at the top of the rankings (or vice-versa).

In some embodiments, a second portfolio may be determined to be similar to a portfolio associated with the corresponding alterations and the portfolios may be linked. Ranking techniques may include the presence of linked portfolios. For example, alterations to a second portfolio may be surfaced at the top of the rankings if the second portfolio is linked to the portfolio associated with the corresponding alterations (or vice-versa).

Figure 8:
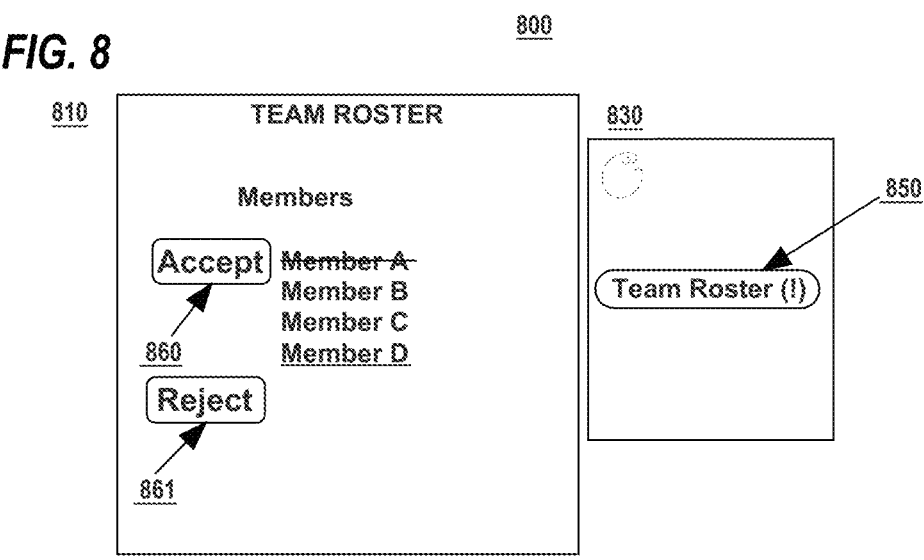
FIG. 8 depicts a fifth example user interface for synchronization for cross-context digital item containers and collaboration.

The second application may provide for confirmation the one or more alteration for items in the second portfolio of digital items. A user may click confirm, accept or the like in order to apply those alterations to the corresponding digital items in the second portfolio of digital items. The example interface 800 of FIG. 8 depicts an "accept" button 860 that can accept input that indicates acceptance of one or more alterations. It also includes a "reject" button 861 that can accept input that indicates rejection of one or more alterations. This is discussed in more detail below.

Whether an alteration is automatically accepted or is accepted after confirmation the local copy of the digital items in the second portfolio of digital items is altered 190. Altering 190 the local copy of the digital item in the second portfolio of digital items may include modifying the document, adding or deleting a file, modifying a spreadsheet, modifying an image and the like based on the originally requested 170 alteration of the digital item in the first portfolio of digital items. As such, after altering 190 the local copy of the digital item in the second portfolio of digital items, the alteration originally made in the first portfolio of digital items will be reflected in the local copy of the digital item in the second portfolio of digital items.

In some embodiments, process 101 terminates or is completed after altering 190 the local copy of the digital item. In other embodiments, a confirmation of the acceptance of an alteration may be recorded 192 and/or a determination 192 may be made whether to send the alteration to others. For example, in some embodiments, when an alteration is accepted by the second application, the second application may record 192 a confirmation of that acceptance. As discussed elsewhere herein, that recordation of acceptance may be used in order to later rank other incoming alterations related to the user that made that original alteration. Additionally, instead of, or in addition to the recordation 192 of the confirmation of acceptance of an alteration. A determination 192 may be made whether to send the alteration to others (e.g., from the second application and second portfolios of digital items to other portfolios with which the digital item was shared). Such a determination may parallel determination 180. For example, if the second application accepts and alteration of a particular digital item and that particular digital item had been shared from the second application previously, then the second application may make a determination to share the alteration that was accepted with, for example, a third application using process 101.

The features of processes 100 and 101 are described as being performed by particular applications (e.g., the first application, second application, and digital portfolio application).

Those application may run separately, each on one or more separate processors. In some embodiments, two or more of those applications may be logically within the same application, and may represent portions of that joint application.

Example Systems

Figure 2:
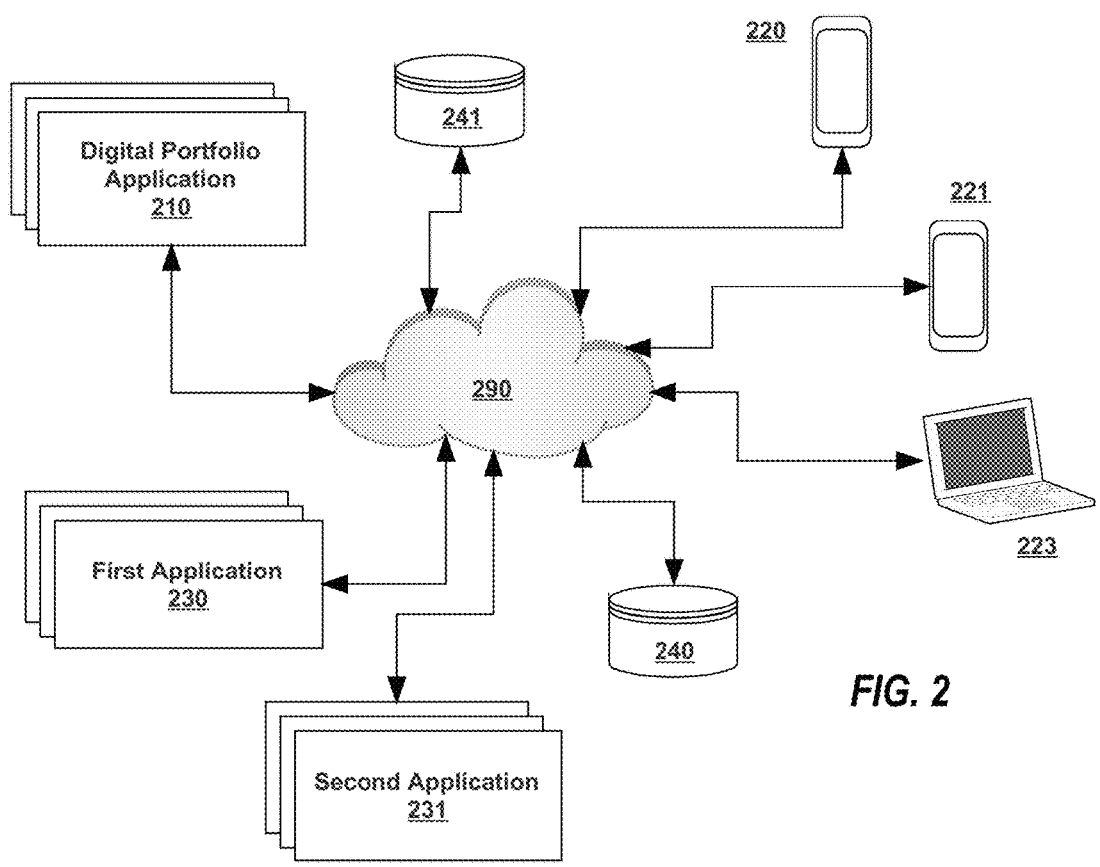
FIG. 2 is a block diagram depicting a system for synchronization for cross-context digital item containers and collaboration.

FIG. 2 is a block diagram depicting a system for cross-context digital items containers and collaboration. As depicted in system 200, numerous electronic devices 210-241 are all connected to a network 290. The network 290 may be the Internet, an intranet, a wide area network, a local area network, and/or any other type of network, such as those described herein. Digital portfolio application 210 is connected to network 290. The digital portfolio application 210 may perform, for example, the features 111-150 and 172-182 depicted in processes 100 and 101 as being performed by a digital portfolio application. The first application 230 and second application 231 may also be connected to network 290. User devices 220-223 may also be connected to network 290 as well as storage modules 240-241. In some embodiments, the first application 230 and second application 231 may execute portions of process 100 and/or process 101 in order to interact with a portfolio of digital items being managed by the digital portfolio application 210 and handle alterations to digital items. In some embodiments, the digital portfolio application 210 has its own storage and stores thereon the portfolio of digital items. In some embodiments, storage 240 and/or 241 may store the portfolio of digital items, a copy of the portfolio of digital items, and/or one or more portfolio of digital items associated with one or more users.

Example Interfaces

FIG. 4 depicts an example user interface for synchronization for cross-context digital item containers and collaboration. In some embodiments, application 410 allows for user selection 420 of text lines B-C. These texts line B-C 420 may be dragged into the portfolio of digital items 430 and copied there in 450. As described elsewhere herein, the portfolio of digital items 430 may also have existing digital items, such as images 440.

FIG. 5 depicts a second example user interface for cross-context digital items containers and collaboration. In a second application 510, such as a team chat user A may interact with other users in the team chat and ask for particular text. User B may then select items 550 from the portfolio of digital items and place them within the team chat using the techniques herein. For example, text lines B-C 550 may be selected from the portfolio of digital items 530 and thereby placed within the team chat as copies of the text lines B-C 560.

Figure 6:
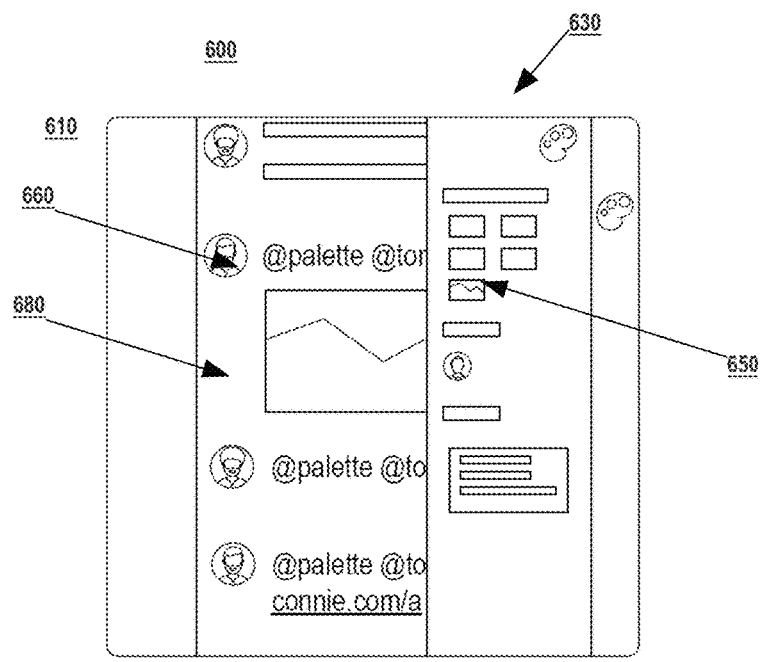
FIG. 6 depicts a third example user interface for synchronization for cross-context digital item containers and collaboration.

FIG. 6 depicts a user interface 600 with a chat program 610 open, as well as a portfolio of digital items 630 according to an embodiment of the techniques herein. In the chat program 610, the user has typed text 660 including "@palette" with an indicator to insert graphic 650 from the portfolio of digital items 630 into the chat program 610. Using the techniques herein, the graphic is inserted as graphic 680 into the chat program 610.

Figure 7:
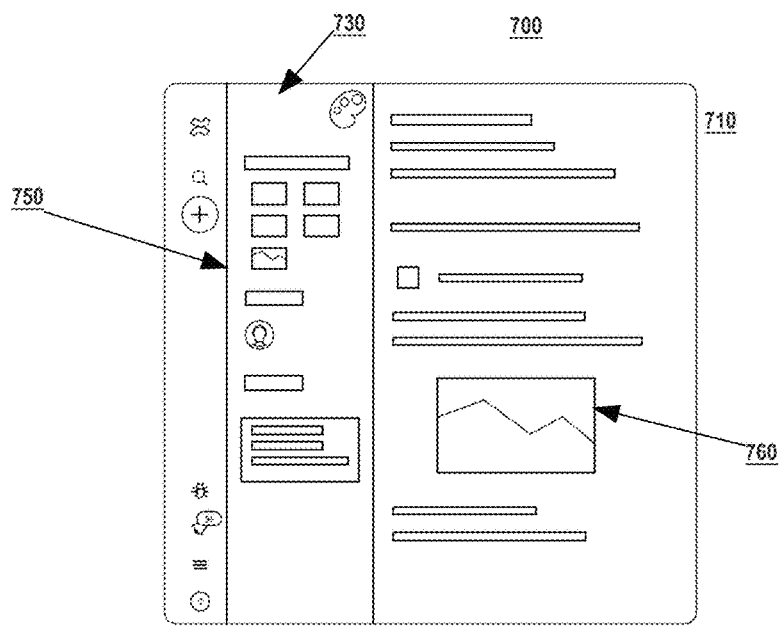
FIG. 7 depicts a fourth example user interface for synchronization for cross-context digital item containers and collaboration.

FIG. 7 depicts a user interface 700 including the interface for a document editor 710 and a portfolio of digital items 730. Using the techniques herein, the system allows the user, without navigating away from the document editor 710 to select digital item 730 (in this case an image) to be inserted into the document as image 760.

FIG. 8 depicts an interface 800 for synchronization for cross-context digital item containers and collaboration. FIG. 8 depicts a portfolio of digital items 830 containing a team roster 850. In some embodiments when an update has come in for a particular digital item in the portfolio of digital items, an indicator may indicate on the user interface 800 and/or in the portfolio of digital items 830 that an update is available for confirmation. For example, team roster 850 is depicted as having an exclamation mark inside parentheses indicating that an update is available for the team roster. When clicked, the team roster may appear as a document 810.

And the updates may be indicated within the document. For example, in the team roster, member A has been indicated with a strikeout indicating that alteration would delete member A. Additionally, member D is in underline text, indicating that member D is being added to the team roster. A single click may accept both the change to deletion of member A and the addition of member D.

For example, clicking the accept button 860 button may accept both the deletion of member A and the addition of member D. Clicking the reject button 861 may indicate rejecting both changes. In other embodiments, not shown in interface 800, each of the components of an alteration may be individually accepted or rejected. As such member A could be deleted without adding member D and vice versa. In various embodiments, other indicators for alterations may be used, such as blinking text for a document or other digital item, highlighting, a separate list of updates, a separate menu that may be used to access updates, and/or the like.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
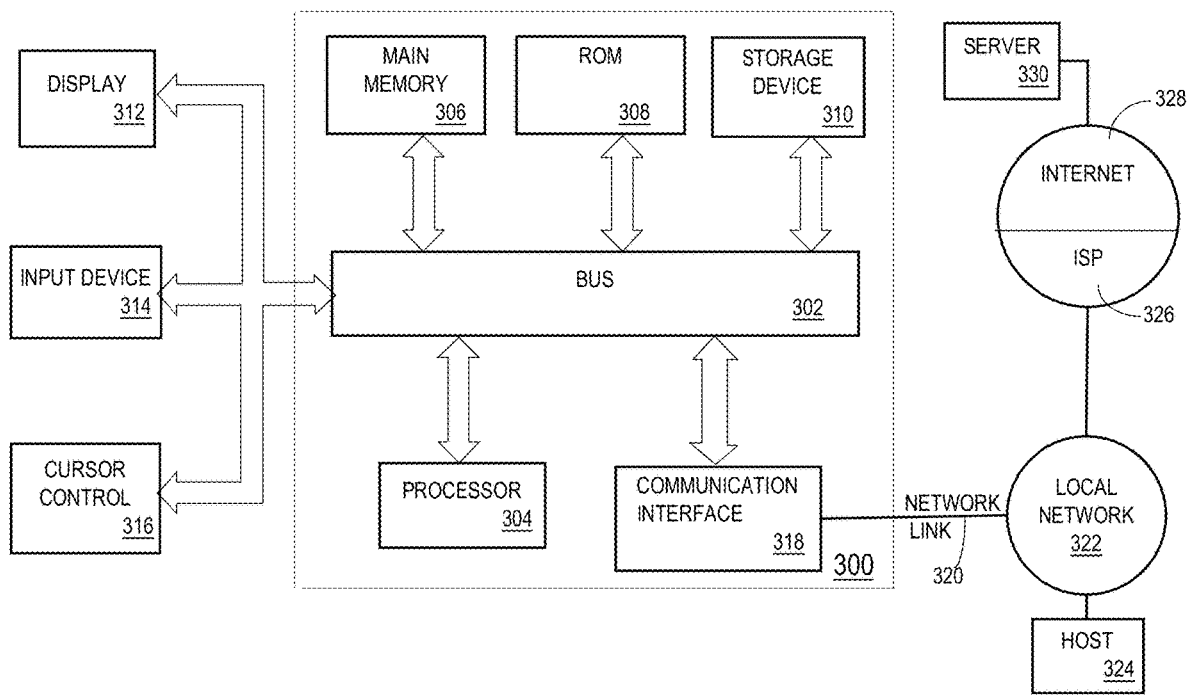
FIG. 3 depicts example hardware for synchronization for cross-context digital item containers and collaboration.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300.

Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services.

Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer system for synchronization for cross-context digital item containers and collaboration, comprising a digital portfolio application running on one or more computing devices, and coupled to a communication network for communication with a first application and a second application, the digital portfolio application being configured to execute digital portfolio instructions, which, when executed perform a method of:

receiving a user command, from a first application, associated with a first user account, running on one or more computing devices, to share a particular digital item from a first portfolio of digital items associated with the first user account with a second portfolio of digital items associated with a second user account, wherein the first portfolio of digital items includes one or more digital items that were copied into the first portfolio of digital items based on other received user commands from one or more other applications;

in response receiving the user command to share the digital item in the first portfolio of digital items to the second portfolio of digital items, making a digital copy of the particular digital item and placing that digital copy of the particular digital item in the second portfolio of digital items;

receiving, at a first digital portfolio application associated with the first portfolio of digital items and running on the one or more computing devices, a request to alter the particular digital item in the first portfolio of digital items;

in response to receiving the request to alter the particular digital item in the first portfolio of digital items, altering the particular digital item in the first portfolio of digital items;

in response to altering the particular digital item in the first portfolio of digital items, determining with whom to share the alteration of the particular digital item in the first portfolio of digital items based on with what portfolio of digital items the particular digital item had previously been shared, wherein determining with whom to share the alteration of the particular digital item comprises determining with whom to share the alteration of the particular digital item based at least in part on previous acceptances of alterations;

when it is determined to share the alteration of the particular digital item with the second portfolio of digital items, sharing the alteration of the particular digital item with a second digital portfolio application associated with the second portfolio of digital items;

determining, with respect to the second portfolio of digital items, whether to accept the alteration of the particular digital item;

when it is determined to alter the particular digital item in the second portfolio of digital items, applying the alteration to the particular digital item in the second portfolio of digital items, and storing a confirmation of the acceptance of the alteration in the second portfolio of digital items.

2. The system of claim 1, wherein the particular digital item has been shared with multiple portfolios of digital items, and, for each particular portfolio of digital items in the multiple portfolios of digital items:
   determining whether to share the alteration of the particular digital item in the first portfolio of digital items with a particular digital portfolio application associated with the particular portfolio of digital items;
   when it is determined to share the alteration of the particular digital item with the particular digital portfolio application associated with particular portfolio of digital items, sharing the alteration of the particular digital item with the particular digital portfolio application.

3. The system of claim 1, the method further comprising:
   receiving multiple alterations for digital items in the second portfolio of digital items; ranking the multiple alterations based on one or more factors, wherein ranking the multiple alterations comprises:
   ranking the multiple alterations based at least in part on similarity of second user account and with a user account associated with a corresponding alteration;
   ranking the multiple alterations based at least in part on whether the second user account has previously accepted alterations from a user account associated with a corresponding alteration; and
   ranking the multiple alterations based at least in part on when the alteration was made;
   providing the ranked, multiple alterations for display.

4. A computer-implemented method comprising:
   receiving a user command, from a first application, associated with a first user account, running on one or more computing devices, to share a particular digital item from a first portfolio of digital items associated with the first user account with a second portfolio of digital items associated with a second user account, wherein the first portfolio of digital items includes one or more digital items that were copied into the first portfolio of digital items based on other received user commands from one or more other applications;
   in response receiving the user command to share the digital item in the first portfolio of digital items to the second portfolio of digital items, making a digital copy of the particular digital item and placing that digital copy of the particular digital item in the second portfolio of digital items;
   receiving, at a first digital portfolio application associated with the first portfolio of digital items and running on the one or more computing devices, a request to alter the particular digital item in the first portfolio of digital items;
   in response to receiving the request to alter the particular digital item in the first portfolio of digital items, altering the particular digital item in the first portfolio of digital items;
   in response to altering the particular digital item in the first portfolio of digital items, determining with whom to share the alteration of the particular digital item in the first portfolio of digital items based on with what portfolio of digital items the particular digital item had previously been shared;
   when it is determined to share the alteration of the particular digital item with the second portfolio of digital items, sharing the alteration of the particular digital item with a second digital portfolio application associated with the second portfolio of digital items;
   determining, with respect to the second portfolio of digital items, whether to accept the alteration of the particular digital item, wherein determining whether to accept the alteration of the particular digital item comprises performing one or more tasks from a list consisting of:
   always automatically accepting the alteration if the alteration is associated with a particular user account; and
   automatically accepting the alteration regardless of with which account the alteration is associated;
   when it is determined to alter the particular digital item in the second portfolio of digital items, applying the alteration to the particular digital item in the second portfolio of digital items;
   wherein the method is performed by one or more computing devices.

5. The method of claim 4, further comprising:
   when it is determined to alter the particular digital item in the second portfolio of digital items, storing a confirmation of the acceptance of the alteration in the second portfolio of digital items;
   wherein determining with whom to share the alteration of the particular digital item comprises determining with whom to share the alteration of the particular digital item based at least in part on previous acceptances of alterations.

6. The method of claim 4, wherein the particular digital item has been shared with multiple portfolios of digital items, and, for each particular portfolio of digital items in the multiple portfolios of digital items:
   determining whether to share the alteration of the particular digital item in the first portfolio of digital items with a particular digital portfolio application associated with the particular portfolio of digital items;
   when it is determined to share the alteration of the particular digital item with the particular digital portfolio application associated with particular portfolio of digital items, sharing the alteration of the particular digital item with the particular digital portfolio application.

7. The method of claim 4, wherein determining whether to accept the alteration of the particular digital item comprises always automatically accepting the alteration if the alteration is associated with a particular user account.

8. The method of claim 4, wherein determining whether to accept the alteration of the particular digital item comprises always automatically accepting the alteration regardless of with which account the alteration is associated.

9. The method of claim 4, further comprising receiving multiple alterations for digital items in the second portfolio of digital items; ranking the multiple alterations based on one or more factors;
   providing for display the ranked, multiple alterations.

10. The method of claim 9, wherein ranking the multiple alterations comprises:
   ranking the multiple alterations based at least in part on similarity of second user account and with a user account associated with a corresponding alteration.

11. The method of claim 9, wherein ranking the multiple alterations comprises ranking the multiple alterations based at least in part on whether the second user account has previously accepted alterations from a user account associated with a corresponding alteration.

12. The method of claim 9, wherein ranking the multiple alterations comprises ranking the multiple alterations based at least in part on when the alteration was made.

13. One or more non-transitory storage media storing instructions which, when executed by one or more computing devices, cause performance of a method of:
- receiving a user command, from a first application, associated with a first user account, running on one or more computing devices, to share a particular digital item from a first portfolio of digital items associated with the first user account with a second portfolio of digital items associated with a second user account, wherein the first portfolio of digital items includes one or more digital items that were copied into the first portfolio of digital items based on other received user commands from one or more other applications;
- in response receiving the user command to share the digital item in the first portfolio of digital items to the second portfolio of digital items, making a digital copy of the particular digital item and placing that digital copy of the particular digital item in the second portfolio of digital items;
- receiving, at a first digital portfolio application associated with the first portfolio of digital items and running on the one or more computing devices, a request to alter the particular digital item in the first portfolio of digital items;
- in response to receiving the request to alter the particular digital item in the first portfolio of digital items, altering the particular digital item in the first portfolio of digital items;
- in response to altering the particular digital item in the first portfolio of digital items, determining with whom to share the alteration of the particular digital item in the first portfolio of digital items based on with what portfolio of digital items the particular digital item had previously been shared;
- when it is determined to share the alteration of the particular digital item with the second portfolio of digital items, sharing the alteration of the particular digital item with a second digital portfolio application associated with the second portfolio of digital items;
- determining, with respect to the second portfolio of digital items, whether to accept the alteration of the particular digital item, wherein determining whether to accept the alteration of the particular digital item comprises performing one or more tasks from a list consisting of:
- always automatically accepting the alteration if the alteration is associated with a particular user account; and
- automatically accepting the alteration regardless of with which account the alteration is associated;
- when it is determined to alter the particular digital item in the second portfolio of digital items, applying the alteration to the particular digital item in the second portfolio of digital items;
- wherein the method is performed by one or more computing devices.

14. The one or more non-transitory storage media of claim 13, the method further comprising:
- when it is determined to alter the particular digital item in the second portfolio of digital items, storing a confirmation of the acceptance of the alteration in the second portfolio of digital items;
- wherein determining with whom to share the alteration of the particular digital item comprises determining with whom to share the alteration of the particular digital item based at least in part on previous acceptances of alterations.

15. The one or more non-transitory storage media of claim 13, wherein the particular digital item has been shared with multiple portfolios of digital items, and, for each particular portfolio of digital items in the multiple portfolios of digital items:
- determining whether to share the alteration of the particular digital item in the first portfolio of digital items with a particular digital portfolio application associated with the particular portfolio of digital items;
- when it is determined to share the alteration of the particular digital item with the particular digital portfolio application associated with particular portfolio of digital items, sharing the alteration of the particular digital item with the particular digital portfolio application.

16. The one or more non-transitory storage media of claim 13, wherein determining whether to accept the alteration of the particular digital item comprises always automatically accepting the alteration if the alteration is associated with a particular user account.

17. The one or more non-transitory storage media of claim 13, wherein determining whether to accept the alteration of the particular digital item comprises always automatically accepting the alteration regardless of with which account the alteration is associated.

18. The one or more non-transitory storage media of claim 13, the method further comprising:
- receiving multiple alterations for digital items in the second portfolio of digital items; ranking the multiple alterations based on one or more factors;
- providing for display the ranked, multiple alterations.

19. The one or more non-transitory storage media of claim 18, wherein ranking the multiple alterations comprises:
- ranking the multiple alterations based at least in part on similarity of second user account and with a user account associated with a corresponding alteration; and
- ranking the multiple alterations based at least in part on whether the second user account has previously accepted alterations from a user account associated with a corresponding alteration.

20. The one or more non-transitory storage media of claim 18, wherein ranking the multiple alterations comprises:
- ranking the multiple alterations based at least in part on when the alteration was made.

* * * * *